United States Patent
Naslavsky et al.

(10) Patent No.: US 8,438,559 B2
(45) Date of Patent: May 7, 2013

(54) METHOD AND SYSTEM FOR PLATFORM-AGNOSTIC SOFTWARE INSTALLATION

(75) Inventors: Ilan Naslavsky, Tel Aviv-Yafo (IL); Michael Fitoussi, Givataiim (IL)

(73) Assignee: Oracle America, Inc., Redwood City, CA (US)

( * ) Notice: Subject to any disclaimer, the term of this patent is extended or adjusted under 35 U.S.C. 154(b) by 1046 days.

(21) Appl. No.: 12/105,950

(22) Filed: Apr. 18, 2008

(65) Prior Publication Data
US 2009/0265701 A1   Oct. 22, 2009

(51) Int. Cl.
*G06F 9/445* (2006.01)
(52) U.S. Cl.
USPC .................. 717/174; 717/175; 717/177
(58) Field of Classification Search .................. 717/172
See application file for complete search history.

(56) References Cited

U.S. PATENT DOCUMENTS

| | | | |
|---|---|---|---|
| 5,361,358 A * | 11/1994 | Cox et al. | 717/174 |
| 6,684,397 B1 * | 1/2004 | Byer et al. | 717/174 |
| 7,124,409 B2 | 10/2006 | Davis et al. | 717/178 |
| 7,337,330 B2 * | 2/2008 | Gatto et al. | 713/191 |
| 7,373,398 B2 * | 5/2008 | McIlroy | 709/221 |
| 7,620,948 B1 * | 11/2009 | Rowe et al. | 717/171 |
| 7,802,082 B2 * | 9/2010 | Kruse et al. | 713/1 |
| 7,853,945 B2 * | 12/2010 | Kramer et al. | 717/174 |
| 8,069,441 B2 * | 11/2011 | Iizuka | 717/174 |
| 2005/0198628 A1 * | 9/2005 | Graham et al. | 717/174 |
| 2005/0235278 A1 * | 10/2005 | Wu et al. | 717/168 |
| 2007/0234344 A1 * | 10/2007 | Hamid et al. | 717/174 |
| 2008/0059782 A1 * | 3/2008 | Kruse et al. | 717/177 |
| 2008/0127088 A1 * | 5/2008 | Harmsen et al. | 717/175 |
| 2008/0172665 A1 * | 7/2008 | McIlroy | 717/177 |
| 2008/0201705 A1 * | 8/2008 | Wookey | 717/175 |
| 2009/0228868 A1 * | 9/2009 | Drukman et al. | 717/175 |

OTHER PUBLICATIONS

Chris Bunch, Neptune: A Domain Specific Language for Deploying HPC Software on Cloud Platforms, 2011, ACM, 10 pages, <URL: http://delivery.acm.org/10.1145/2000000/1996120/p59-bunch.pdf>.*

Jon Obertheide, When Mobile is Harder Than Fixed (and Vice Versa): Demystifying Security Challenges in Mobile Environments, 2010, ACM, 6 pages, <URL: http://delivery.acm.org/10.1145/1740000/1734595/p43-oberheide.pdf>.*

(Continued)

*Primary Examiner* — Matt Kim
*Assistant Examiner* — Hua Lu
(74) *Attorney, Agent, or Firm* — Osha Liang LLP

(57) ABSTRACT

A method for platform-agnostic software installation involves obtaining a knowledge package, where the knowledge package includes guidelines for obtaining and installing software deliverables. The method further involves obtaining a profile, where the profile includes platform-agnostic data indicating a desired system state. The method further involves distributing the knowledge package and the profile to a first managed host and a second managed host, where the first managed host has a first operating system platform, and where the second managed host has a second operating system platform. The method further involves filtering the profile based on the knowledge package to obtain a first platform-specific profile for the first managed host and a second platform-specific profile for the second managed host, updating the first managed host to the desired system state using the first platform-specific profile, and updating the second managed host to the desired system state using the second platform-specific profile.

14 Claims, 10 Drawing Sheets

OTHER PUBLICATIONS

John Bresnahan, Managing Appliance Launches in Infrastructure Clouds, 2011, ACM, 7 pages, <URL: http://delivery.acm.org/10.1145/2020000/2016755/al 2-bresnahan.pdf>.*

Sam Averitt, Virtual Computing Laboratory (VCL), 2007, Google Scholar, 5 pages, <URL: http://renoir.csc.ncsu.edu/Faculty/Vouk/Papers-Public/VCL_ICVCI_May07.pdf>.*

* cited by examiner

METHOD AND SYSTEM FOR PLATFORM-AGNOSTIC SOFTWARE INSTALLATION

BACKGROUND

Computer systems typically operate according to instructions encoded in software. To make the instructions accessible to a computer system, the software is first installed on a computer-readable medium such as a compact disc, a disk drive, flash memory, network-attached storage (NAS), etc. The instructions are then loaded into the computer system's memory from the computer-readable medium and subsequently executed by the computer system's processor(s).

In many cases, software includes multiple subcomponents. Some or all of these subcomponents may depend on each other's presence in the computer system's memory to function correctly. Further, some subcomponents may be incompatible with each other, or may be compatible only with particular versions of each other. Therefore, for the software to function correctly, the correct subcomponents are generally required. Incorrect combinations of subcomponents may result in unexpected results such as invalid data, memory faults, system crashes, etc.

Determining the correct subcomponents for software is typically a manual task, requiring a user to correctly identify the dependencies and incompatibilities between individual subcomponents. Depending on the number of subcomponents, this task can be daunting, even for those developing the software. For example, multiple versions of subcomponents may exist, and the dependencies and incompatibilities between subcomponents may not be immediately apparent.

Further, obtaining those subcomponents may be a complicated task in itself, especially if all the subcomponents are not accessible from a single source. The user may effectively be required to not only know the dependencies and incompatibilities between subcomponents, but also where to obtain those subcomponents. Therefore, the ability to obtain and install software sometimes requires a breadth of knowledge and technical expertise not available to a typical user.

SUMMARY

In general, in one aspect, the invention relates to a method for platform-agnostic software installation. The method comprises obtaining a knowledge package, wherein the knowledge package comprises guidelines for obtaining and installing a plurality of software deliverables. The method further comprises obtaining a profile, wherein the profile comprises platform-agnostic data indicating a desired system state. The method further comprises distributing the knowledge package and the profile to a first managed host and a second managed host, wherein the first managed host has a first operating system platform, and wherein the second managed host has a second operating system platform. The method further comprises filtering the profile based on the knowledge package to obtain a first platform-specific profile for the first managed host and a second platform-specific profile for the second managed host, updating the first managed host to the desired system state using the first platform-specific profile, and updating the second managed host to the desired system state using the second platform-specific profile.

In general, in one aspect, the invention relates to a computer system. The system comprises a first managed host having a first operating system platform, a second managed host having a second operating system platform, and an installation service. The installation service is configured to obtain a knowledge package, wherein the knowledge package comprises guidelines for obtaining and installing a plurality of software deliverables. The installation service is further configured to obtain a profile, wherein the profile comprises platform-agnostic data indicating a desired system state. The installation service is further configured to distribute the knowledge package and the profile to the first managed host and the second managed host. The computer system further includes a first job agent configured to filter the profile based on the knowledge package to obtain a first platform-specific profile, and update the first managed host to the desired system state using the first platform-specific profile. The computer system further includes a second job agent configured to filter the profile based on the knowledge package to obtain a second platform-specific profile, and update the second managed host to the desired system state using the second platform-specific profile.

In general, in one aspect, the invention relates to a system. The system comprises means for obtaining a knowledge package, wherein the knowledge package comprises guidelines for obtaining and installing a plurality of software deliverables. The system further comprises means for obtaining a profile, wherein the profile comprises platform-agnostic data indicating a desired system state. The system further comprises means for distributing the knowledge package and the profile to a first managed host and a second managed host, wherein the first managed host has a first operating system platform, and wherein the second managed host has a second operating system platform. The system further comprises means for filtering the profile based on the knowledge package to obtain a first platform-specific profile for the first managed host and a second platform-specific profile for the second managed host, means for updating the first managed host to the desired system state using the first platform-specific profile; and means for updating the second managed host to the desired system state using the second platform-specific profile.

Other aspects of the invention will be apparent from the following description and the appended claims.

DETAILED DESCRIPTION

Figure 1:
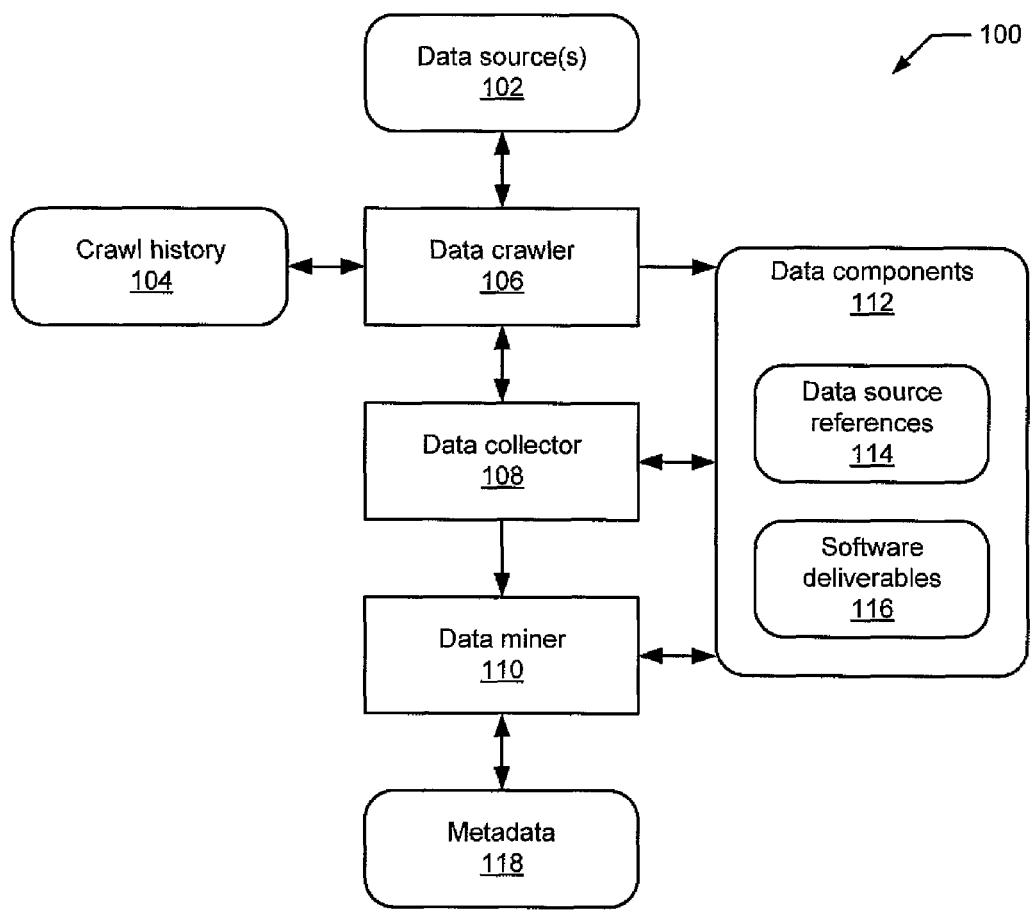
FIGS. 1-4 show diagrams of systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention.

However, it will be apparent to one of ordinary skill in the art that the invention may be practiced without these specific details. In other instances, well-known features have not been described in detail to avoid unnecessarily complicating the description.

In general, embodiments of the invention provide a method and system for installing software deliverables. Specifically, software deliverables are installed on different managed hosts, having different platforms, using a platform-agnostic profile. For each platform, the platform-agnostic profile is filtered based on a knowledge package to determine which parts of the profile are relevant to that platform. The profile indicates a desired system state, and may include probe scripts, pre-installation actions, install sets, configuration actions, and/or post-installation actions. Each of these potential profile components is discussed in detail below.

As discussed herein, the "platform" of a managed host refers to the specific operating system and/or version of operating system executing on the managed host. For example, Microsoft Windows® is a different platform from Linux. Further, Windows® XP is a different platform from Windows Vista®, and Red Hat Linux is a different platform from Fedora Linux. Windows® and Windows Vista® are registered trademarks of Microsoft, Inc. in Redmond, Wash. Moreover, operating systems having different kernel versions may be considered different platforms. In general, when two operating systems are sufficiently different to introduce software incompatibilities, the operating systems may be considered different platforms.

As discussed herein, software deliverables may include many different types of data associated with a software package such as an operating system, an operating system patch, an operating system update, a software application, a software application patch, a software application update, etc. Specifically, software deliverables may include source code, executable files, user guides, readme files, change logs, application data, multimedia files, hypertext markup language (HTML), any other similar type of software deliverable, or any combination thereof.

FIG. 1 shows a diagram of a system (100) in accordance with one or more embodiments of the invention. In one or more embodiments, the system (100) includes a data crawler (106) configured to crawl one or more data source(s) (102) to obtain data components (112). 'Crawling' is a term of art referring to a broad category of automated methods and systems for accessing and analyzing data. The data source(s) (102) may include one or more web pages, file transfer protocol (FTP) servers, compact discs, databases, newsgroups, any other similar type of local or remote data source, or any combination thereof.

In one or more embodiments, the data components (112) stored by the data crawler (106) include copies of software deliverables (116) found at the data source(s) (102), or portions thereof, and may also include data source references (114) identifying the data source(s) (102) where each of the software deliverables (116) was obtained. If one of the data source(s) (102) requires a login and password, the data source references (114) may include that information as well, or an indicator that such information is required. Depending on the type(s) of data source(s) (102) crawled, the data crawler (106) may obtain the software deliverables (116) from the data source(s) (102) by downloading the software deliverables (116) over a network connection, transferring the software deliverables (116) across a file subsystem, by any other electronic access method, or any combination thereof.

Further, to avoid storing redundant data components (112), the data crawler (106) may be configured to maintain a crawl history (104) of data source(s) (102) previously crawled. Because the data source(s) (102) may change over time (e.g., as web pages are updated, as new versions of the software deliverables (116) are released, etc.), the crawl history (104) may also indicate the times when the data source(s) (102) were most recently crawled. The data crawler (106) may be configured to use information stored in the crawl history (104) as a basis for regularly scheduled crawls of one or more of the data source(s) (102).

In one or more embodiments, the data crawler (106) is further configured to generate logical identifiers—in effect, digital 'fingerprints'—for each of the software deliverables (116) obtained, and store the logical identifiers in the crawl history (104). The logical identifiers may be compared with software deliverables encountered during crawling to determine whether those software deliverables are logically equivalent to the software deliverables (116) already obtained. In one or more embodiments, the use of logical identifiers in this manner prevents storage of redundant copies of the software deliverables (116). For example, the logical identifiers may be used to ensure that distinct versions of the software deliverables (116) are each obtained only once.

In one or more embodiments, the system (100) includes a data collector (108) configured to process information stored in the data components (112). Specifically, the data collector (108) may be configured to parse the software deliverables (116) to identify additional data source references. For example, one or more of the software deliverables (116) may include a uniform resource locator (URL) stored in a header file or in HTML that identifies the location of a related software deliverable. In such cases, the data collector (108) may be configured to identify the URL and forward the URL to the data crawler (106) for crawling. Those skilled in the art will appreciate that the software deliverables (116) may include many different types of references to data sources. Further, the data collector (108) may be configured to identify only certain types of references.

In one or more embodiments, the system (100) includes a data miner (110) configured to process the software deliverables (116). Specifically, the data miner (110) is configured to mine the software deliverables (116) to obtain metadata (118) about the software deliverables (116). 'Data mining' is a term of art referring to a broad category of methods and systems for extracting information from existing data. Data mining typically involves performing pattern recognition based on known data characteristics, such as extensible markup language (XML) schemas, HTML tags, commonly used text strings, identifiable data structures, file header formats, etc. In some cases, data mining may use a learning algorithm, whereby results of the pattern recognition are analyzed and used to enhance (i.e., broaden or narrow in scope) the pattern recognition itself. Those skilled in the art will appreciate that many different data mining techniques exist.

In one or more embodiments, the data miner (110) is configured to mine the software deliverables (116) for metadata (118) concerning the software deliverables' (116) various dependencies and conflicts, if any exist. For example, the metadata (118) may identify that a particular software deliverable requires a particular version of another software deliverable. Alternatively, the metadata (118) may identify that a particular software deliverable is explicitly incompatible with a particular version of another software deliverable. Those skilled in the art will appreciate that many different types of dependencies and conflicts exist. For example, some software deliverables are only compatible with specific operating systems or hardware platforms.

In one or more embodiments, the data miner (110) is configured to identify only specific types of dependencies and conflicts. Further, the specific types of dependencies and conflicts to mine for may be user-configurable via an administrative interface (not shown). In any case, the dependencies and conflicts identified by the data miner (110) are stored as metadata (118) associated with the software deliverables (116). In one or more embodiments, the metadata (118) also includes the data source references (114), thereby serving as a central access point for different types of information about the software deliverables (116).

The data miner (110) may further be configured to parse the data components (112) to identify individual software deliverables (116) to be mined. For example, one or more of the software deliverables (116), as obtained from the data source(s) (102), may be stored in an archive file (not shown) such as a zip file, a tape archive (tar) file, a cabinet (CAB) file, a Java® archive (JAR) file, etc. The data miner (110) may be configured to extract the individual software deliverables (116) from the archive file(s), so that the individual software deliverables (116) are available for data mining. Java® is a registered trademark of Sun Microsystems, Inc. of Santa Clara, Calif.

In one or more embodiments of the invention, only a single data crawler (106), a single data collector (108), and a single data miner (110) are used to perform the functions described above. Alternatively, multiple data crawlers, multiple data collectors, and/or multiple data miners may be used. For example, the data crawler (106) may be configured to instantiate separate data collectors for each of the software deliverables (116) obtained from the data source(s) (102). Further, the data collector (108) may be configured to instantiate separate data crawlers whenever additional data source references are identified. Moreover, multiple data miners may be used to individually process each of the software deliverables (116). Many different arrangements of data crawler(s), data collector(s), and data miner(s) may be used to accomplish the functions described herein.

Further, the crawl history (104), data components (112), and metadata (118) may be stored in many different types of storage locations. In one or more embodiments, the software deliverables (116) are stored as raw data in a file system, while the crawl history (104), data source references (114), and metadata (118) are stored in tables of a relational database. Alternatively, these components may be stored separately and/or in different types of storage locations. Filtered views, inventories, rules, and/or knowledge packages may also be stored in one or more of these storage locations. The aforementioned components are discussed in detail below with respect to FIGS. 2-4.

Figure 2:
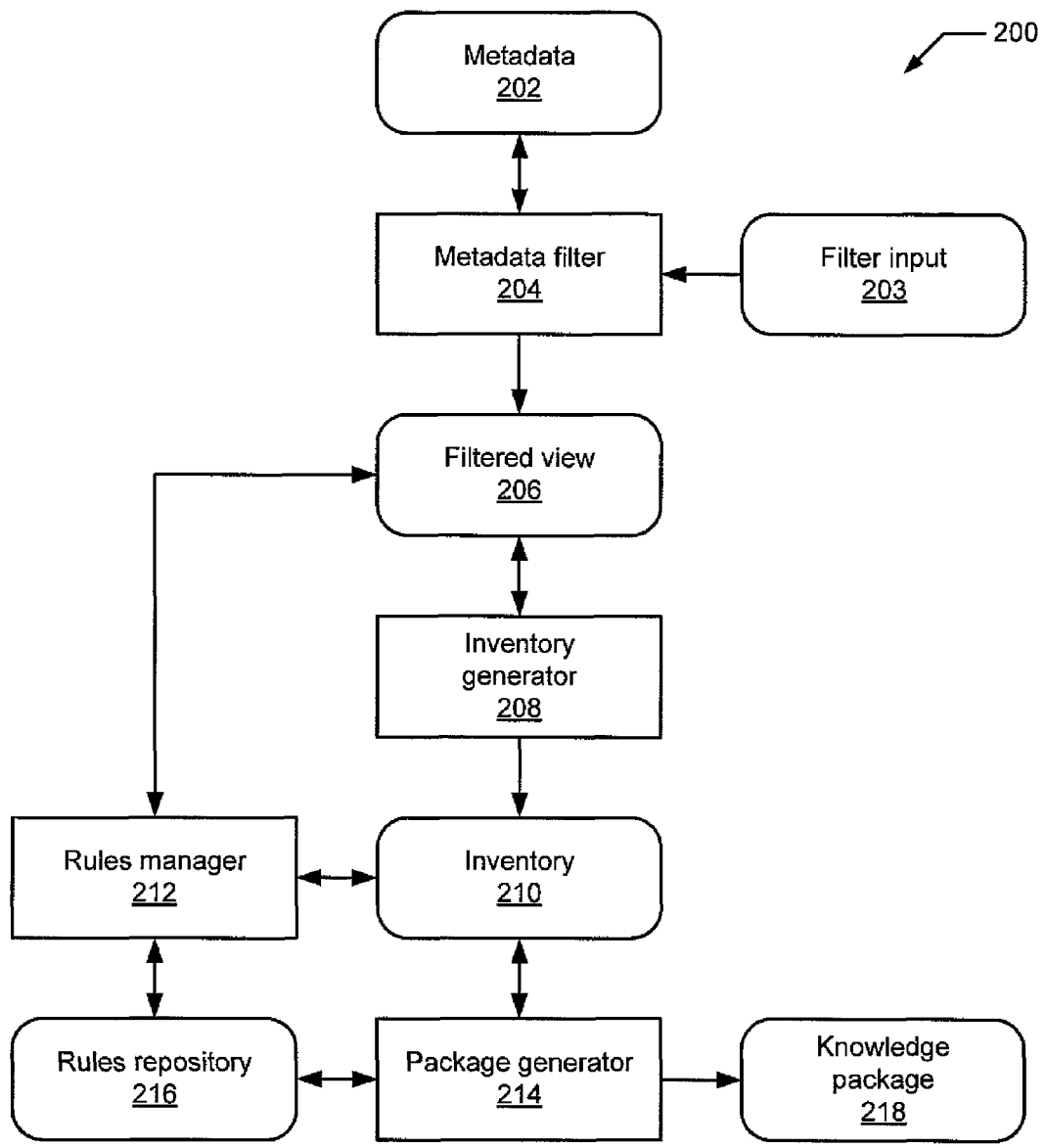

In one or more embodiments of the invention, metadata about software deliverables (e.g., metadata (118) of FIG. 1) is used as a basis for generating a knowledge package. FIG. 2 shows a diagram of a system (200) in accordance with one or more embodiments of the invention. Specifically, the system (200) is configured to use metadata (202) about software deliverables as input, and generate a knowledge package (218) as output.

In one or more embodiments, the knowledge package (218) includes guidelines for obtaining and installing software deliverables. Specifically, the guidelines may be associated with one or more particular software package(s). However, some of the software deliverables described by the metadata (202) may not be relevant to a given knowledge package (218). For example, some of the software deliverables may be associated with unrelated software packages or versions thereof. Accordingly, the system (200) may include a metadata filter (204) configured to generate a filtered view (206) of the metadata (202), where the filtered view (206) is restricted to metadata for a subset of software deliverables that are relevant to the knowledge package (218).

Specifically, in one or more embodiments, the filtered view (206) is based on filter input (203) to the metadata filter (204). In one or more embodiments, the filter input (203) specifies one or more software package(s) for which to generate guidelines, and the metadata filter (204) is configured to generate the filtered view (206) based on the specified software package(s). Alternatively, the filter input (203) may include membership criteria for filtering the metadata (202). For example, membership criteria may include date(s) when software deliverables were obtained, regular expressions to apply to file names, specific data sources, etc. The filter input (203) may come from a database, an XML file, manual user input, or any other data source, depending on the specific implementation of the metadata filter (204).

Further, in one or more embodiments, the system (200) includes an inventory generator (208) configured to generate an inventory (210) of software deliverables associated with the metadata included in the filtered view (206). The inventory generator (208) may generate the inventory (210) using the filtered view (206) itself as input, or may alternatively use a separate list or enumeration (not shown) of software deliverables to include in the inventory (210). In one or more embodiments, the inventory (210) is a listing of the subset of software deliverables relevant to the knowledge package (218), and does not include the actual software deliverables. In one or more embodiments, filtering the metadata (202) and generating the inventory (210) in this manner reduces the amount of subsequent processing required to generate the knowledge package (218).

Those skilled in the art will appreciate that merely knowing the software deliverables required for a software package may not be sufficient for correctly obtaining and installing the software package. In many cases, the software deliverables must be installed in a particular order. Further, some software deliverables may require particular configuration settings to operate correctly. If the correct installation order and configuration requirements are not respected, one or more software deliverables may fail to install and/or the software package may not operate correctly.

Accordingly, in one or more embodiments, the system (200) includes a rules manager (212) configured to process the inventory (210) and the filtered view (206) to generate a set of rules for obtaining and installing the required software deliverables correctly. The rules may specify data sources, installation priorities, configuration settings, etc. Further, in one or more embodiments, the rules manager (212) is configured to identify any software deliverables that should be added or removed from the inventory (210) based on the generated rules. In one or more embodiments, the rules are stored in a rules repository (216), and serve as a basis for a package generator (214) to generate the knowledge package (218). Examples of embodiments of the rules manager (212) and package generator (214) are discussed in detail below with respect to FIGS. 3 and 4.

Figure 3:
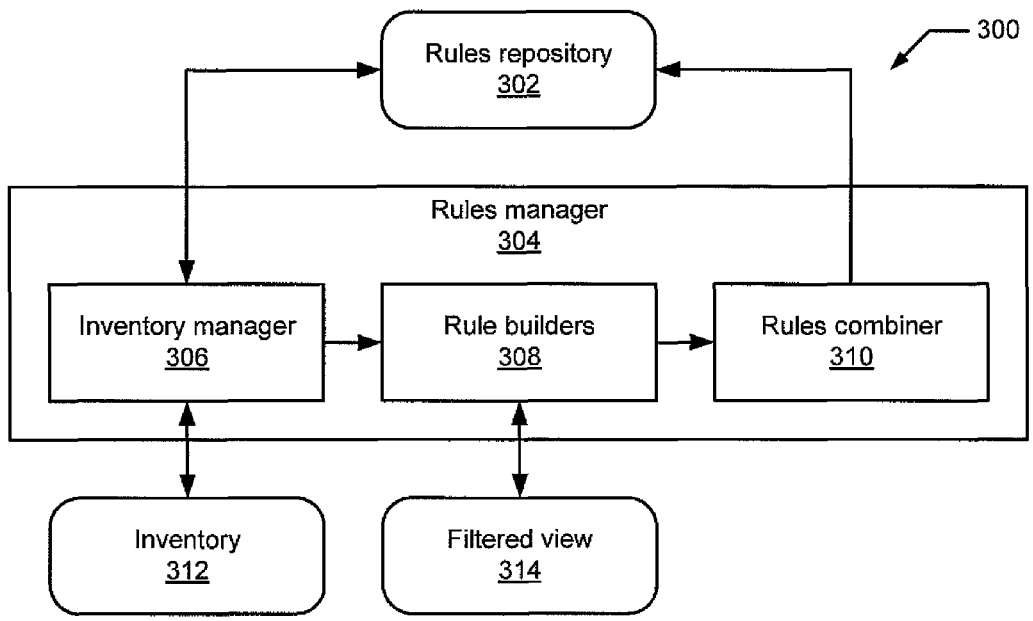

FIG. 3 shows a diagram of a system (300) in accordance with one or more embodiments of the invention. The system (300) includes a rules manager (304) configured to generate rules about obtaining and installing software deliverables. Specifically, the rules manager (304) is configured to generate the rules using an inventory (312) of software deliverables and a filtered view (314) of metadata about the software deliverables.

In one or more embodiments, the rules manager (304) includes an inventory manager (306) configured to initialize rule builders (308) for each software deliverable listed in the inventory (312). The rule builders (308), in turn, are configured to use the metadata (e.g., data source references, dependencies, conflicts, etc.) in the filtered view (314) to generate rules for obtaining and installing the individual software deliverables.

In one or more embodiments, the rules generated by the rule builders (308) are effectively component rules, i.e., rules that are each associated with individual software deliverable components of a software package. For example, a rule may indicate a data source where a given software deliverable can be obtained. If the data source requires a login and password, the rule may include that information as well, or an indication that such information is required. In one or more embodiments, placeholders for logins and passwords are provided so that a recipient of the knowledge package can enter access credentials. Further, a rule may list other software deliverables that a given software deliverable depends on, and may indicate if any software deliverables must be installed before or after the given software deliverable.

As discussed above, the rules generated by the rule builders (308) may be component rules. In one or more embodiments, the rule builders (308) are configured to forward component rules to a rules combiner (310). The rules combiner (310), in turn, is configured to combine component rules into rules for obtaining and installing the software package as a whole. For example, the rules combiner (310) may use component rules to identify an installation sequence for multiple software deliverables. In one or more embodiments, the rules combiner (310) is configured to store these rules into a rules repository (302) for later access.

In some cases, rules generated by the rules manager (304) may indicate relationships (e.g., dependencies, conflicts, etc.) of software deliverables listed in the inventory (312) with software deliverables that are not listed in the inventory (312). Further, a rule may indicate a conflict between software deliverables that are both listed in the inventory (312). Depending on the specific software deliverables listed in the inventory (312), many different types of inaccuracies in the inventory (312) may be identified by the rules.

In one or more embodiments, the inventory manager (306) is configured to process rules in the rules repository (302) to identify whether the aforementioned types of inaccuracies exist in the inventory (312). The inventory manager (306) may also be configured to add or remove software deliverables from the inventory (312) to correct inaccuracies in the inventory (312). Further, the inventory manager (306) may be configured to initialize rule builders (308) to generate new rules based on changes to the inventory (312). For example, if a software deliverable is added to the inventory (312), the inventory manager (306) may initialize a rule builder to generate a rule for obtaining and installing that software deliverable. Further, because the filtered view (314) may also be inconsistent with the rules, the inventory manager (306) and/or rule builders (308) may be configured to update the metadata in the filtered view (314) accordingly.

In one or more embodiments, the rules manager (304) is configured to populate the rules repository (302) and update the inventory (312) iteratively until the inventory (312) describes a closed subset of software deliverables (i.e., a subset that fully satisfies the dependencies of the individual software deliverables included in the subset). In one or more embodiments, an iterative process such as that described above helps ensure that the knowledge package generated from the rules repository (302) includes all of the necessary information for fully and correctly installing the specified software package(s).

Figure 4:
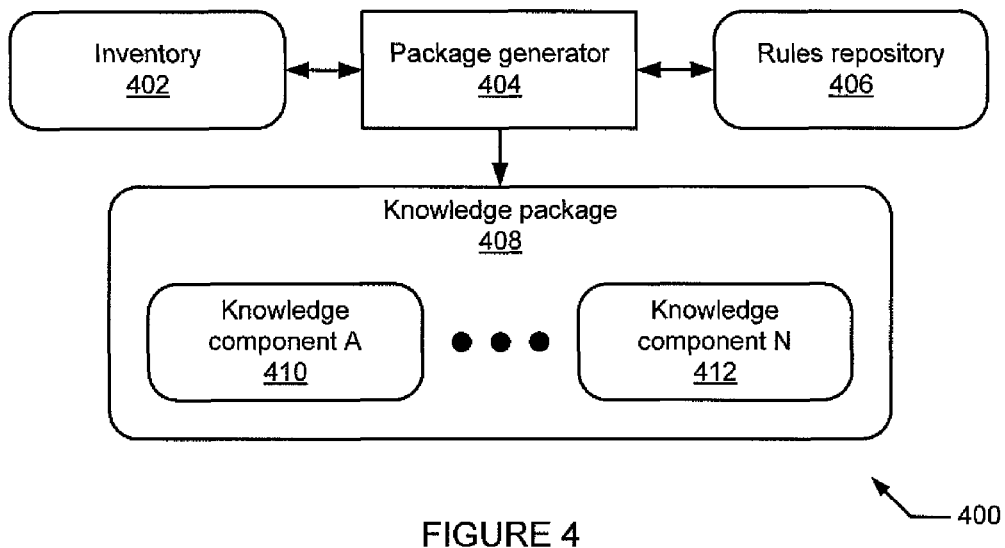

FIG. 4 shows a diagram of a system (400) in accordance with one or more embodiments of the invention. The system (400) includes a package generator (404) configured to generate a knowledge package (408) using an inventory (402) of software deliverables associated with one or more software package(s), and a rules repository (406) describing rules for obtaining and installing those software deliverables.

Specifically, in one or more embodiments, the package generator (404) is configured to obtain rules from the rules repository (406) for each of the software deliverables listed in the inventory (402). In one or more embodiments, the package generator (404) is configured to generate the knowledge package (408) by converting the rules into a standardized format suitable for distribution to users. For example, the knowledge package (408) may use the universal knowledge base (UKB) format by Sun Microsystems, Inc. In other words, the package generator (404) effectively translates the rules into guidelines that the user can follow to actually obtain and install the software package(s), either manually or via an automated processing of the knowledge package (408).

More specifically, in one or more embodiments, the knowledge package (408) includes multiple knowledge components (e.g., knowledge component A (410), knowledge component N (412)). Each knowledge component includes guidelines for obtaining and installing one or more of the software deliverables specified in the inventory (402). For example, knowledge components may include data source references, logins and passwords (or placeholders for such access credentials), installation parameters, configuration settings, etc. In one or more embodiments, the knowledge components are XML sub-trees in an XML file, and the guidelines for obtaining and installing the software deliverables are stored in XML tags in the XML sub-trees. Further, in one or more embodiments, the relationships between software deliverables represented in the knowledge package (408) define the order in which the software deliverables should be installed. Thus, the knowledge package (408) effectively includes guidelines for obtaining and installing the software package(s) as a whole.

Figure 5:
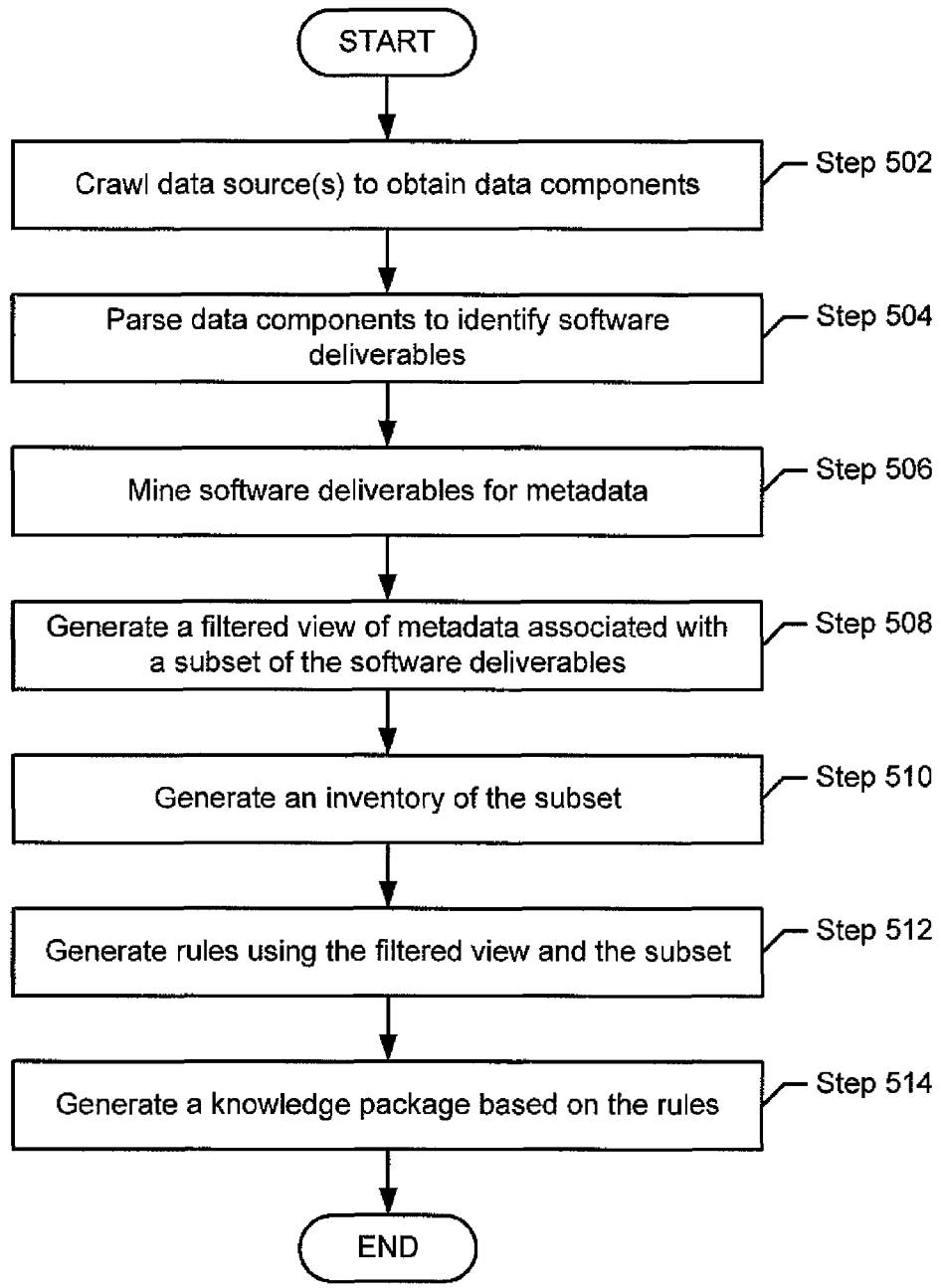
FIG. 5 shows a flowchart of a method for generating a knowledge package in accordance with one or more embodiments of the invention.

FIG. 5 shows a flowchart of a method for generating a knowledge package in accordance with one or more embodiments of the invention. In one or more embodiments of the invention, one or more of the steps shown in FIG. 5 may be omitted, repeated, and/or performed in a different order than the order shown in FIG. 5. Accordingly, embodiments of the invention should not be considered limited to the specific ordering of steps shown in FIG. 5.

In one or more embodiments of the invention, in Step 502, one or more data sources are crawled to obtain data components. The data components include copies of software deliverables associated with one or more software packages, and may also include data source references to the data source(s) where the software deliverables were obtained.

In one or more embodiments of the invention, in Step 504, data components are parsed to identify individual software deliverables. For example, as discussed above with respect to FIG. 1, the data components may include one or more archive files containing multiple software deliverables.

In one or more embodiments of the invention, in Step 506, individual software deliverables are mined for metadata. The metadata may include data source references or any other type of information about the software deliverables, including relationships to other software deliverables (e.g., dependencies, conflicts, etc.).

In one or more embodiments of the invention, in Step 508, a filtered view of the metadata is generated. As discussed above, the filtered view may be for a subset of the available software deliverables. In one or more embodiments, the subset is associated with one or more specific software packages. Further, in Step 510, an inventory of the subset is generated. The inventory is a listing of software deliverables in the subset.

In one or more embodiments of the invention, in Step 512, the filtered view of Step 508 and the inventory of Step 510 are used to generate rules about the subset of software deliverables. Specifically, the rules describe how to obtain and install the software deliverables. Subsequently, in Step 514, a knowledge package is generated based on those rules. The knowledge package includes guidelines for obtaining and installing the specified software package(s) as a whole.

Embodiments of the method described above allow for the generation of a knowledge package that facilitates obtaining and installing a software package. Specifically, by using metadata about software deliverables in the software package to generate guidelines for the obtaining and installing the software package, the method reduces the amount of effort and knowledge required for users of the software package. Using a crawling mechanism to obtain the metadata may further reducing the burden placed on the user. Moreover, because the rules take into account dependencies and conflicts between software deliverables, the guidelines in the knowledge package provide a high degree of reliability and certainty that the software package(s) will install and operate correctly.

In some cases, a knowledge package as described above (whether generated as described above or by another method) may still contain errors. That is, installing software deliverables based on the guidelines in the knowledge package may not have the desired results. Accordingly, it may be helpful to validate the knowledge package prior to releasing the knowledge package to end users, and to correct any errors detected during validation.

Figure 6:
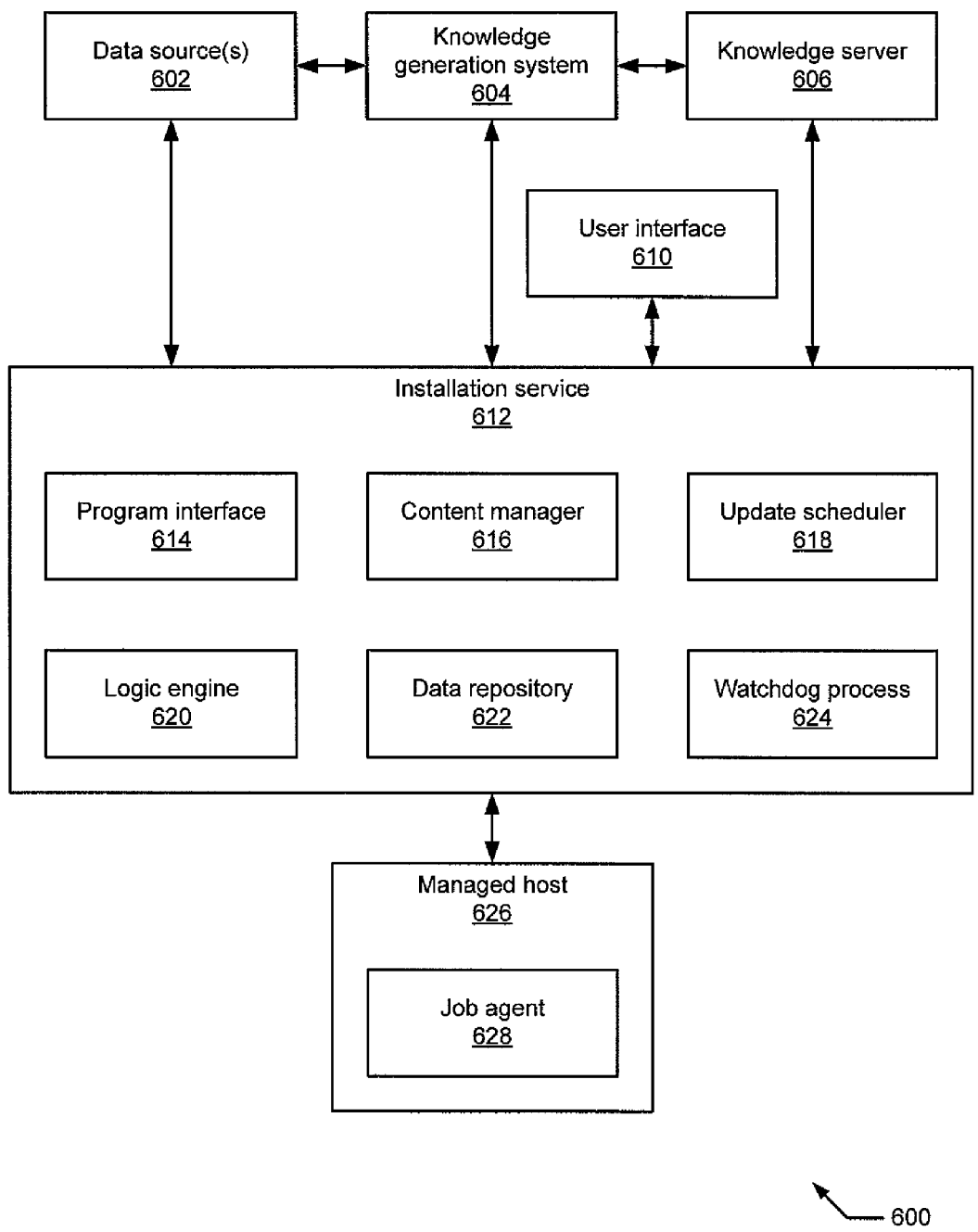
FIGS. 6-9 show diagrams of systems in accordance with one or more embodiments of the invention.

FIG. 6 shows a diagram of a system (600) in accordance with one or more embodiments of the invention. Specifically, the system (600) is configured to obtain and install software deliverables from one or more data source(s) (602) using a knowledge package generated by a knowledge generation system (604). In one or more embodiments, the knowledge generation system (604) operates as described above with respect to FIGS. 1-5.

Broadly speaking, in one or more embodiments, the system (600) is configured to operate as follows. Initially, the knowledge generation system (604) generates a knowledge package and transmits the knowledge package to an installation service (612). The knowledge package may be transmitted automatically as part of an unattended process (i.e., a process that does not require human intervention), or may be transmitted in response to a user command. The installation service (612) is configured to manage installation of the software deliverables referenced in the knowledge package. Specifically, the installation service (612) dispatches installation tasks to one or more job agent(s) (628) executing on one or more managed host(s) (626).

For the purposes of this discussion, a managed host is a computer system on which software deliverables are installed according to the guidelines in a knowledge package. In other words, the managed host(s) (626) are configured to 'host' installed versions of the software deliverables. The managed host(s) (626) may also 'host' the software deliverables in the sense of providing operational access to other computer systems, but this type of functionality is not necessarily implied in the term 'managed host.' Further, the word 'managed' refers to the fact that the software deliverables are installed on the managed host(s) (626) under control of the installation service (612). In other words, the installation service (612) is configured to 'manage' the set of software deliverables installed on the managed host(s) (626).

In one or more embodiments, the knowledge generation system (604) is communicatively coupled with a knowledge server (606). The knowledge server (606) is configured to store the knowledge package for access by authorized clients such as the installation service (612). In one or more embodiments of the invention, clients are authorized if the clients are located in a trusted network and/or have valid login credentials. For example, the knowledge server (606) may include a password-protected web server or FTP server. If many such clients exist, multiple load-balanced knowledge servers (not shown) may be used. In one or more embodiments, the knowledge server (606) is also configured to store copies of software deliverables obtained from the data source(s) (602).

In the following discussion, various components of the installation service (612) are described in detail. To avoid unnecessary clutter, individual connections between these components are not shown in FIG. 6. However, based on the following descriptions, such connections will be apparent to those of ordinary skill in the art. Further, those skilled in the art will appreciate that one or more of the components shown in FIG. 6 may not be required to practice embodiments of the invention.

In one or more embodiments, the installation service (612) includes an application program interface (API) (614). The API (614) is an interface that allows external components to control behavior of the installation service (612). In other words, the API (614) provides programmatic access to the installation service's (612) business logic. Those skilled in the art will appreciate that many different types of APIs exist, such as common gateway interface (CGI) scripts, remote procedure calls (RPC), and various proprietary protocols. In one or more embodiments of the invention, commands received by the API (614) are processed and dispatched to other components of the installation service (612) depending on the type of command received.

Further, the API (614) may be configured to process commands received from a user interface (610). The user interface (610) may include a display, keyboard, mouse, and/or other user interface components known in the art. Information presented on the display may take many different forms, such as a command line interface (CLI), a windowed software application, or a form on a web page. In addition, the user interface (610) may be configured to display results of a simulated and/or actual installation. Further, the user interface (610) may include administrative tools for managing the installation service (612). For example, the user interface (610) may provide access to administrative functionality of the logic engine (620) discussed below.

In one or more embodiments, the installation service (612) includes a content manager (616). The content manager (616) is configured to obtain the knowledge package from the knowledge server (606) and provide the knowledge package to the job agent(s) (628). Further, the content manager (616) may be configured to obtain software deliverables from the knowledge server (606) and/or the original data source(s) (602) and provide the software deliverables to the job agent(s) (628) for installation.

In one or more embodiments, the content manager (616) is configured to 'pull' the knowledge package from the knowledge server (606)—that is, the knowledge server (606) may provide the knowledge package only when requested by the content manager (616). Alternatively, the knowledge server (606) may be configured to 'push' the knowledge package to the content manager (616). Further, the content manager (616) may provide other services such as generating incident reports and hosting optional installation modules. Embodiments of the content manager (616) are discussed in detail below with respect to FIG. 7.

In one or more embodiments, the installation service (612) includes an update scheduler (618). The update scheduler (618) is configured to query the knowledge server (606) to determine whether any updates to the knowledge package are available. The update scheduler (618) is configured to instruct the content manager (616) to obtain the updated version of the knowledge package if an update is available. Thus, the update scheduler (618) is responsible for periodically ensuring that the knowledge package used by the installation service (612) is the most up-to-date version available. The update scheduler (618) may not be required if the knowledge server (606) is configured to 'push' updates to the content manager (616).

In one or more embodiments, the installation service (612) includes a logic engine (620). The logic engine (620) is configured to receive installation jobs via the API (614) and identify the lower-level tasks included in the job. In one or more embodiments, a job is defined as the set of tasks the job includes. For example, a job associated with a particular software deliverable may include separate tasks to obtain, install, configure, and/or execute the software deliverable according to the guidelines in a given knowledge package.

After identifying the individual tasks, the logic engine (620) dispatches the tasks to the job agent(s) (628) for processing. The tasks for a given job may be dispatched as a group (i.e., in a single data structure representing the entire job) or may be dispatched individually or in subsets. In one or more embodiments, the logic engine (620) is configured to identify and dispatch tasks as soon as jobs are received. Alternatively, the logic engine (620) may include job scheduling functionality. In any case, a job is considered completed when all of the component tasks of the job have been completed.

In one or more embodiments, each task includes a profile indicating a desired system state—i.e., the state of each of the managed host(s) (626) once the task has been performed successfully. In one or more embodiments, profiles include one or more of the following types of data: probe scripts; pre-installation actions; install sets; configuration actions; and post-installation actions.

In one or more embodiments, probes are executable components configured to perform tests on the managed hosts(s) (626). Further, probes may be associated with specific tasks and executed prior to performing those tasks. Based on the results of the tests, tasks may be executed conditionally. For example, a probe may be used to detect whether a previous task completed successfully. If the probe returns a result of TRUE, then the next task may be performed. If the probe returns a result of FALSE, then the next task may be aborted. Those skilled in the art will appreciate that many different types of conditions may be detected by a probe, and results are not limited to Boolean values. In one or more embodiments, the results of probes are used to ensure that the desired system state is achieved. An error message may be generated when a probe detects a deviation from the desired system state.

In one or more embodiments, pre-installation actions include actions to be performed before installing or upgrading a software deliverable. For example, a pre-installation action may include stopping a daemon prior to upgrading or removing the daemon. In one or more embodiments, the use of pre-installation actions helps protect system integrity and avoid other system errors (e.g., software conflicts or locked files) when tasks are performed.

In one or more embodiments, install sets are lists of software deliverables that are to be installed on the managed host(s) (626). In other words, install sets indicate all of the software deliverables that must be installed for the desired system state to be satisfied.

In one or more embodiments, configuration actions include configuration files, registry settings, and other variables associated with the configuration of software deliverables. Performing a configuration action involves placing a configuration file in the appropriate location, updating the registry settings, and/or assigning variables as indicated by the configuration actions. In one or more embodiments of the invention, proper execution of all configuration actions is required to satisfy the desired system state.

In one or more embodiments, post-installation actions include actions to be performed after a software deliverable has been installed. For example, a post-installation action may include starting a daemon that has just been installed or upgraded. In other words, the desired system state may include actual execution of the installed software deliverables, and post-installation actions may be used to help achieve the desired system state by executing the installed software deliverables.

Further, profiles may be platform-agnostic. That is, data in the profiles may not be targeted at a specific platform, and may require conversion to platform-specific instructions. In one or more embodiments, platform-agnostic profiles allow the same tasks to be submitted to managed hosts having different platforms (e.g., different operating systems or different versions of the same operating system). In one or more embodiments, the job agent(s) (628) are responsible for converting the data in the profiles to platform-specific instructions.

Alternatively, profiles may be made platform-agnostic by including separate components (e.g., probe scripts, pre-installation actions, install sets, configuration actions, and post-installation actions) for each target platform, and the job agent(s) (628) may be configured to identify the correct components to use for the respective managed host(s) (626). In other words, profiles may be considered platform-agnostic only within a particular set of supported platforms. In one or more embodiments of the invention, the job agent(s) (628) are configured to filter platform-agnostic profiles based on knowledge packages, to determine which parts of the platform-agnostic profiles are relevant to the platforms on which the job agent(s) (628) are executing.

In one or more embodiments, a task may include one or more policies. In one or more embodiments, policies are pre-defined answers to questions that may arise during execution of a task. For example, installation of a software deliverable may require installing prerequisites (i.e., other software deliverables that the original software deliverable requires to function correctly). During installation of the software deliverable, a prompt may request permission to install the prerequisites. A policy may be used to define a "yes" or "no" answer to the prompt. Thus, if such a policy is present, installation of the software deliverable may automatically proceed or abort based on the information in the policy. Those skilled in the art will appreciate that many types of prompts and corresponding answers exist. In one or more embodiments, policies used in this manner help reduce the amount of user intervention required to perform tasks.

Further, each task may include a target host list. Specifically, the target host list includes information that uniquely identifies each of the managed host(s) (626) for which the task is to be performed (e.g., Internet Protocol (IP) addresses or host names). Each task is submitted to all of the managed host(s) (626) identified in the task's target host list. As discussed above, tasks may include platform-agnostic profiles. Accordingly, the target host list may include managed hosts having different platforms.

In one or more embodiments, the logic engine (620) also provides various administrative functions. For example, the logic engine (620) may include functionality for organizing the managed host(s) (626) into groups (e.g., when processing a single job for multiple managed hosts at once), obtaining a list of software components already present on the managed host(s) (626), or creating point-in-time snapshots of the states of the managed host(s) (626). Such snapshots may be used for post-installation rollbacks or for comparing the states of different managed hosts. Further, the logic engine (620) may include functionality for managing and authenticating users of the installation service (612). In one or more embodiments of the invention, administrative functionality of the logic engine (620) is accessible to administrators via the user interface (610).

In one or more embodiments, the installation service (612) includes a data repository (622). The data repository (622) is a storage location for data generated by other components of the installation service (612). Embodiments of the data repository (622) are discussed in detail below with respect to FIG. 8. Further, the installation service (612) may include a watchdog process (624) configured to monitor other components of the installation service (612) such as the logic engine (620). Specifically, in one or more embodiments, the watchdog process (624) is configured to restart components that fail. Thus, in one or more embodiments, the watchdog process (624) helps ensure continued operation of the installation service (612) with minimal user intervention.

Figure 7:
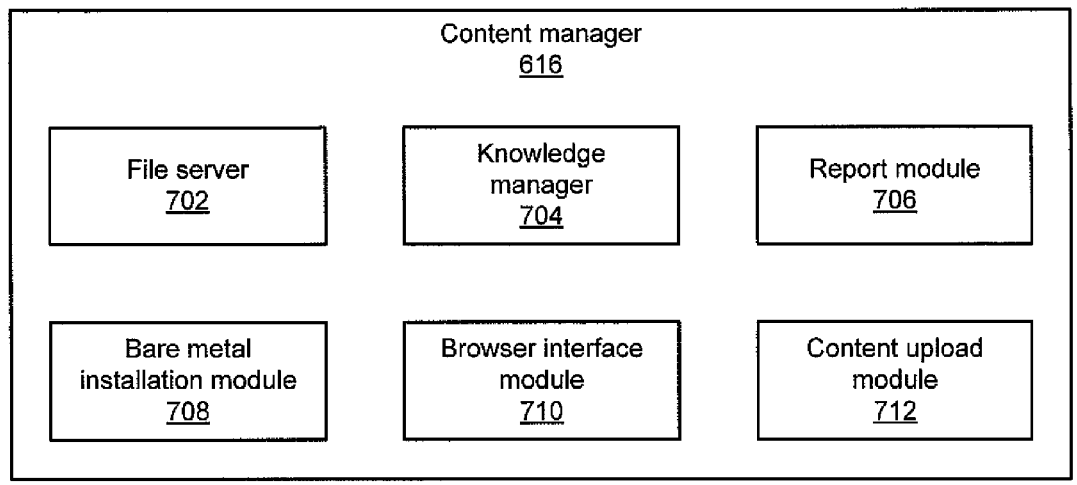

FIG. 7 shows a detailed diagram of the content manager (616) in accordance with one or more embodiments of the invention. To avoid unnecessary clutter, individual connections between components of the content manager (616) are not shown in FIG. 7. However, based on the following descriptions, such connections will be apparent to those of ordinary skill in the art. Further, those skilled in the art will appreciate that one or more of the components shown in FIG. 7 may not be required to practice embodiments of the invention.

As discussed above, the content manager (616) may be configured to perform a variety of functions such as obtaining and providing the knowledge package to job agents, obtaining and providing software deliverables to job agents, generating incident reports, and hosting optional installation modules. Each of these functions is discussed in detail below.

In one or more embodiments, the content manager (616) includes a file server (702). The file server (702) is configured to store the knowledge package, as well as software deliverables obtained from the knowledge server and/or the original data source(s). Further, the content manager (616) may include a knowledge manager (704) configured to manage the contents of the file server (702). In particular, the knowledge manager (704) may be configured to track which knowledge packages and software deliverables (or versions thereof) are stored in the file server (702). Further, the content manager (616) may be configured to merge updated versions of the knowledge package and/or software deliverables with the existing contents of the file server (702).

In one or more embodiments, the knowledge manager (704) also includes functionality to extend an existing knowledge package with guidelines for obtaining and installing additional software deliverables—i.e., software deliverables that are not already referenced by the knowledge package. For example, the additional software deliverables may come from a data source that was not considered when the knowledge package was originally generated. In order to extend a knowledge package, the knowledge manager (704) may include functionality similar to that discussed with respect to FIGS. 1-5. In one or more embodiments, the knowledge manager (704) allows administrators of the installation service to easily customize existing knowledge packages.

In one or more embodiments, the content manager (616) includes a report module (706). The report module (706) is configured to receive updates on job statuses from job agents, and to generate incident reports based on those updates. An incident report may indicate that a job completed successfully, or may indicate an installation error—i.e., an error during execution of one or more installation tasks by a job agent. For example, an incident report may indicate a missing file, a hardware driver exception, a software incompatibility, or an invalid configuration setting. Those skilled in the art will appreciate that many different types of installation errors may occur. In some cases, an installation error may be caused by an error in the knowledge package itself. Thus, incident reports may provide a basis for correcting errors in knowledge packages.

In one or more embodiments, the content manager (616) includes a bare metal installation module (708). The bare metal installation module (708) includes functionality to perform bare metal installations on managed hosts. The term 'bare metal' refers to a computer system that does not yet have any software installed, including an operating system. Thus, in one or more embodiments, the bare metal installation module (708) allows the installation service to process knowledge packages that include guidelines for obtaining and installing operating systems. Further, in one or more embodiments, the bare metal installation module (708) allows for bare metal installations that are unattended—i.e., installations of operating systems without requiring human data entry during the installation process.

In one or more embodiments, the bare metal installation module (708) is configured to operate as follows. In one or more embodiments, a managed host includes a provisioning mechanism for installing software deliverables on the managed host when an operating system is not already present. One example of a provisioning mechanism is the Preboot eXecution Environment (PXE) by Intel Corporation. PXE may be combined with operating system-specific solutions such as Kickstart for Red Hat Linux. In one or more embodiments, the provisioning mechanism broadcasts its presence over a network, via the managed host's network card. The bare metal installation module (708) detects the broadcasted message, and transmits instructions to the provisioning mechanism to install the desired operating system. The specific operating system to install may be indicated by guidelines in a knowledge package. Further, the instructions transmitted to the managed host may include instructions to install a job agent. The job agent may be installed and used to perform additional tasks after the operating system has been installed. In one or more embodiments, leveraging existing provisioning mechanisms in this manner allows for the guidelines contained in knowledge packages to be applied to managed hosts that do not yet have an operating system installed.

In one or more embodiments, the content manager (616) includes an alternative interface module (710). As the name implies, the alternative interface module (710) provides an alternative to the standard user interface provided by the installation service. For example, if the standard user interface is a CLI interface, then the alternative interface module (710) may provide a web interface. Further, the alternative interface module (710) may provide access to management functions not accessible via the standard user interface. Thus, in one or more embodiments, the alternative interface module (710) expands the options available for administering the installation service. Further, the alternative interface module (710) may maintain its own set of users and user permissions.

In one or more embodiments, the content manager (616) includes a content upload module (712). As discussed above, the knowledge manager (704) may include functionality for extending existing knowledge packages with guidelines for obtaining and installing additional software deliverables. In one or more embodiments, the content upload module (712) includes functionality for uploading those software deliverables to the file server (702), for example from a compact disc (CD), digital video disc (DVD), or another location.

Figure 8:
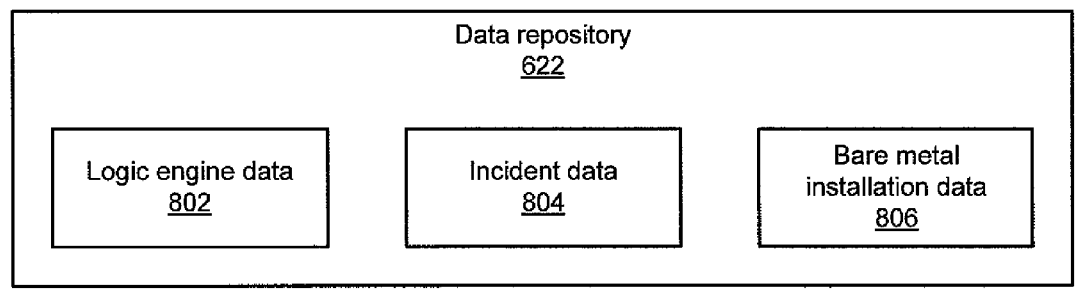

As discussed above, data generated by components of the installation service, including the content manager (616), may be stored in a data repository. FIG. 8 shows a detailed diagram of the data repository (622) in accordance with one or more embodiments of the invention.

In one or more embodiments, the data repository (622) is configured to store logic engine data (802). The logic engine data (802) includes data used by the logic engine, such as user credentials, information about the managed host(s), managed host groupings, installation profiles, policies, and job requests.

In one or more embodiments, the data repository (622) is configured to store incident data (804). The incident data (804) includes information about installation errors reported by the job agent(s) executing on the managed host(s). In one or more embodiments, the incident data (804) is organized according to the affected software deliverables, managed hosts, and/or groups of managed hosts. Further, the incident data (804) may include information about fixes or patches that are available to address particular incidents.

In one or more embodiments, the data repository (622) is configured to store bare metal installation data (806). The bare metal installation data (806) may include a variety of information associated with the bare metal installation process described above. For example, the bare metal installation data (806) may include information broadcasted by a managed host's provisioning mechanism, such as the managed host's media access control (MAC) address or Internet protocol (IP) address. The bare metal installation data (806) may also include information about the type and/or version of the operating system to install on the managed host. Further, the bare metal installation data (806) may include information entered by a user.

Figure 9:
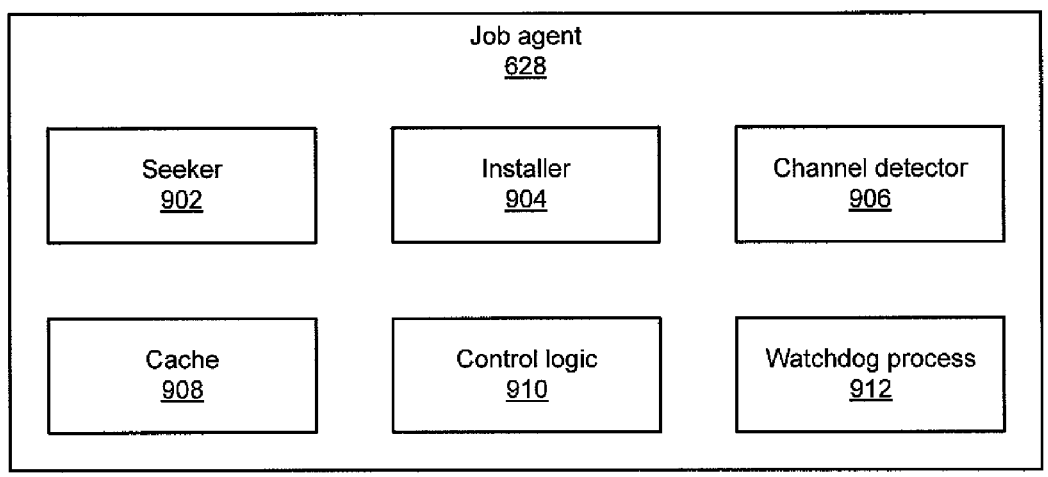

As discussed above, while the installation service is responsible for managing jobs as a whole, individual installation tasks are performed by the job agent(s). FIG. 9 shows a detailed diagram of a job agent (900) in accordance with one or more embodiments of the invention. To avoid unnecessary clutter, individual connections between components of the job agent (900) are not shown in FIG. 9. However, based on the following descriptions, such connections will be apparent to those of ordinary skill in the art. Further, those skilled in the art will appreciate that one or more of the components shown in FIG. 9 may not be required to practice embodiments of the invention.

In one or more embodiments, the job agent (900) includes a seeker (902). The seeker (902) is configured to detect (i.e., 'seek') the current configuration of the managed host, including the installed software, hardware, and the underlying system architecture (e.g., northbridge, southbridge, central processing unit (CPU) type, etc.). For example, in a UNIX-based system, the seeker (902) may be configured to traverse the /dev/ directory to determine which device drivers are installed. Further, the seeker (902) may be configured to generate a digital 'fingerprint' (i.e., unique identifier) for each component in the configuration. The digital fingerprints may be compared with software deliverables referenced in the knowledge package to determine which of the software deliverables are already installed. The seeker (902) may be a script, a compiled program, a dynamically linked library (DLL), or any other executable module. In one or more embodiments of the invention, multiple different seekers (not shown) are used. Different seekers may be responsible for gathering information associated with different subsystems of the managed host. For example, different seekers may be used to gather information about storage devices, CPU, installed software, and software patches.

In one or more embodiments, the job agent (900) includes an installer (904). The installer (904) is a platform-specific utility configured to install, upgrade, and/or remove software deliverables according to the installation tasks submitted to the job agent (900). Removal of a software deliverable is considered an installation task to the extent that the removal advances the managed host toward the desired system state. In one or more embodiments of the invention, multiple different installers (not shown) are used. Different installers may be responsible for installing different types of software deliverables (or components thereof) on the managed host. For example, different installers may be used to install Red Hat Package Manager (RPM) packages, configuration files, and patches. Further, different installers may be used to remove software deliverables (or components thereof) from the managed host.

In one or more embodiments, the job agent (900) includes a channel detector (906). The channel detector (906) is configured to determine the 'channel' associated with the managed host. In one or more embodiments of the invention, a 'channel' is defined as the particular operating system version executing on the managed host. For example, different point versions of a particular operating system may be considered different channels. As another example, a 32-bit version of an operating system may be considered a different channel from a 64-bit version of the same operating system.

In one or more embodiments of the invention, each knowledge package is associated with one or more channels. The job agent (900) may use the channel to identify the correct knowledge package(s) for the managed host. Further, managed hosts may be associated with specific channels, and may be grouped according to the associated channels. In one or more embodiments, grouping managed hosts according to the associated channels allows jobs to be dispatched to all managed hosts in a group. In one or more embodiments of the invention, this grouping is controlled by the logic engine (620 of FIG. 6) discussed above. Moreover, the knowledge manager (704 of FIG. 7) discussed above may be configured to update knowledge packages based on the associated channels. In this manner, channels may be used to help prevent unrelated information from accidentally being incorporated into a knowledge package.

In one or more embodiments, the job agent (900) includes a cache (908). The cache (908) is configured to store the knowledge package being processed by the job agent (900), along with software deliverables associated with the knowledge package. The cache (908) may also be configured to store temporary data generated during execution of installation tasks by the job agent (900). In other words, the cache (908) may be thought of as a local installation cache. In one or more embodiments of the invention, the cache (908) is populated during a simulated installation of the software deliverables, and an actual installation of the software deliverables is not performed until the simulation is complete.

In one or more embodiments, the job agent (900) includes control logic (910). The control logic (910) is configured to receive an installation task and generate platform-specific instructions based on the task. Specifically, in one or more embodiments, the control logic (910) is configured to filter a platform-agnostic profile included in the installation task, based on a knowledge package, to determine which parts of the platform-agnostic profile are relevant to the platform on which the job agent (900) is executing.

Specifically, in one or more embodiments, the control logic (910) is configured to determine an optimal sequence of installation instructions by analyzing the task, the corresponding knowledge package, and the current state of the managed host.

In this context 'optimal' refers to reducing the number of changes made to the managed host. However, optimal does not necessarily refer to the absolute minimum number of steps mathematically possible, and may simply indicate a 'best effort' attempt to minimize the number of changes to the managed host. For example, based on the managed host's current state, the control logic (910) may determine that a given software deliverable is already present and does not need to be reinstalled. Further, the control logic (910) may be configured to analyze relationships between software deliverables referenced in the knowledge package to identify the correct installation sequence. In one or more embodiments, the control logic (910) is configured to dispatch installation instructions to the installer (904) based on these analyses.

In one or more embodiments, the job agent (900) includes a watchdog process (912). The watchdog process (912) is configured to monitor the job agent (900) and the subcomponents of the job agent. Specifically, in one or more embodiments, the watchdog process (912) is configured to restart a subcomponent if the subcomponent fails. Thus, the watchdog process (912) may help ensure continued operation of the job agent (900) with minimal user intervention.

In one or more embodiments, the job agent (900) includes functionality for simulating an installation of software deliverables. In one or more embodiments of the invention, simulation involves preparing the managed host and the job agent (900) for an actual installation, without actually installing the software deliverables. For example, the simulation may involve determining the full list of software deliverables required, and storing the required software deliverables in the cache (908). In one or more embodiments of the invention, caching the software deliverables helps ensure that the required software deliverables are available when an actual installation is performed. Further, the simulation may involve gathering responses to prompts that may appear during the installation, so that the prompts do not interrupt the actual installation. In one or more embodiments of the invention, the simulation is performed under control of the installer (904). However, other component(s) of the job agent (900) may be used, including components not shown in FIG. 9.

Figure 10:
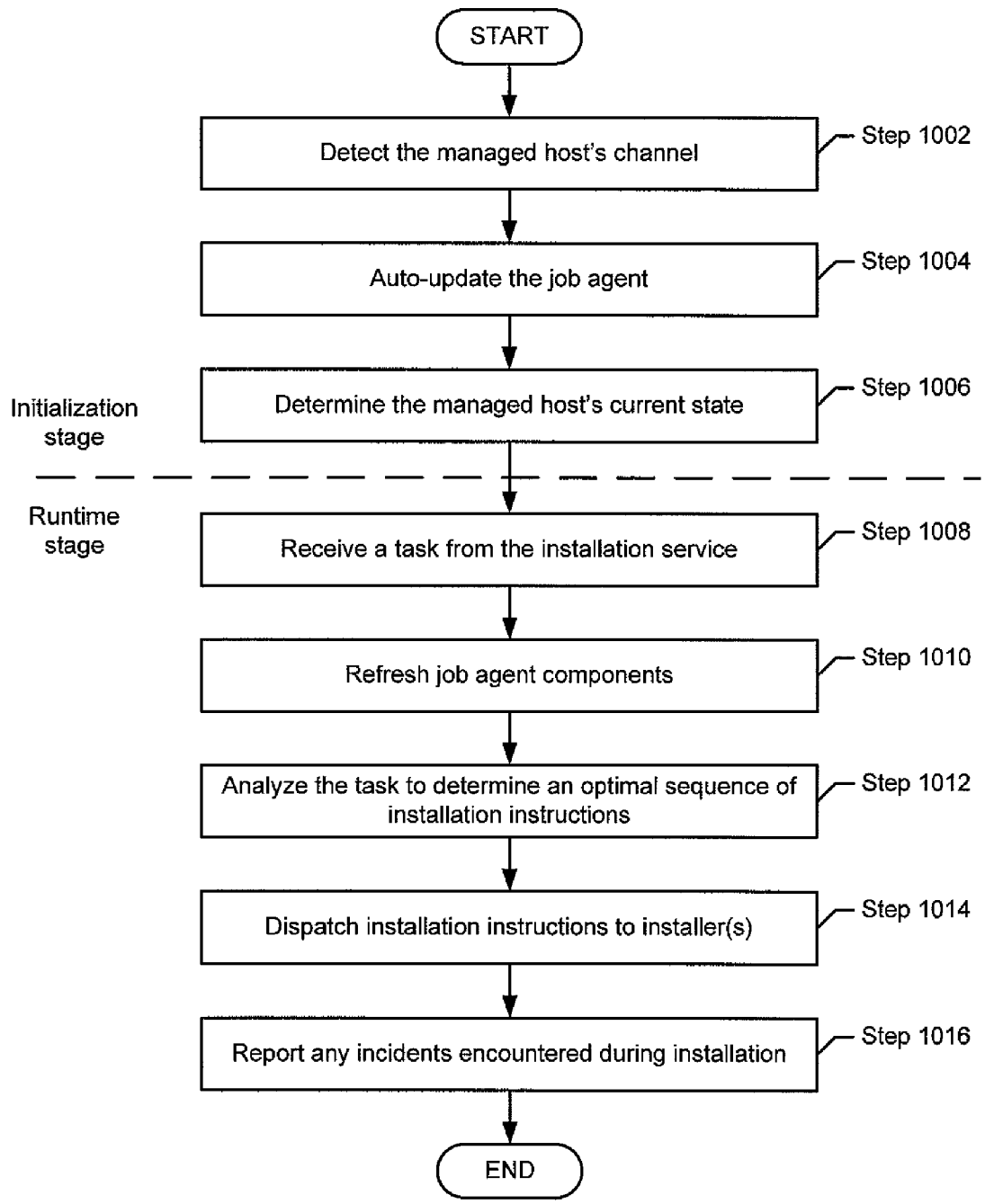
FIG. 10 shows a flowchart of a method for operating a job agent in accordance with one or more embodiments of the invention.

FIG. 10 shows a flowchart of a method for operating a job agent in accordance with one or more embodiments of the invention. In one or more embodiments of the invention, one or more of the steps shown in FIG. 10 may be omitted, repeated, and/or performed in a different order than the order shown in FIG. 10. Accordingly, embodiments of the invention should not be considered limited to the specific ordering of steps shown in FIG. 10.

In one or more embodiments of the invention, job agents are operated in two distinct stages. The initialization stage is completed when the job agent is first started on a managed host, and involves all the preparations necessary to enter the runtime stage. The runtime stage is the main operational stage whereby installation tasks are received and handled by the job agent. In one or more embodiments of the invention, the runtime stage is executed iteratively for as long as the job agent is fully operational.

Referring first to the initialization stage, in one or more embodiments of the invention, in Step 1002, the job agent detects the managed host's channel. As discussed above, the channel is defined as the particular operating system version executing on the managed host. Various possible uses for the channel are discussed above (e.g., selecting knowledge packages or grouping managed hosts).

In one or more embodiments of the invention, in Step 1004, the job agent auto-updates itself. Specifically, the job agent may contact the installation service to determine whether any updated job agent components (e.g., seeker, installer, etc.) are available. If any such updates are available, then the job agent may obtain the necessary files and install the updates. In one or more embodiments of the invention, the job agent must restart itself to apply the updated components. Alternatively, updates may be obtained in a form that does not require a restart.

In one or more embodiments of the invention, in Step 1006, the job agent determines the managed host's current state. Specifically, the job agent may use one or more seekers (described above) to identify the managed host's installed software, hardware, and underlying system architecture. Further, the job agent may transmit state information to the installation service, so that the information is available for administrative purposes.

Referring now to the runtime stage, in one or more embodiments of the invention, the job agent waits until a task is received from the installation service (Step 1008). Because some time may have elapsed since the initialization stage, in Step 1010, the job agent may refresh its components using the auto-update process described above. In one or more embodiments of the invention, periodic auto-updates (whether performed on a schedule or triggered by received tasks) help ensure that the job agent is executing the most up-to-date components.

In one or more embodiments of the invention, when a task is received, the job agent analyzes the task to determine the optimal sequence of installation instructions (Step 1012). As discussed above, the optimal sequence of installation instructions may be based on a combined analysis of the task, the knowledge package, and the managed host's current state.

Once the optimal sequence of installation instructions has been determined, in Step 1014, the job agent dispatches the installation instructions to one or more installers (described above). The installers then proceed to execute the instructions to install the software deliverables. If any incidents are encountered during the installation, then, in Step 1016, the job agent reports the incidents to the installation service.

Figure 11:
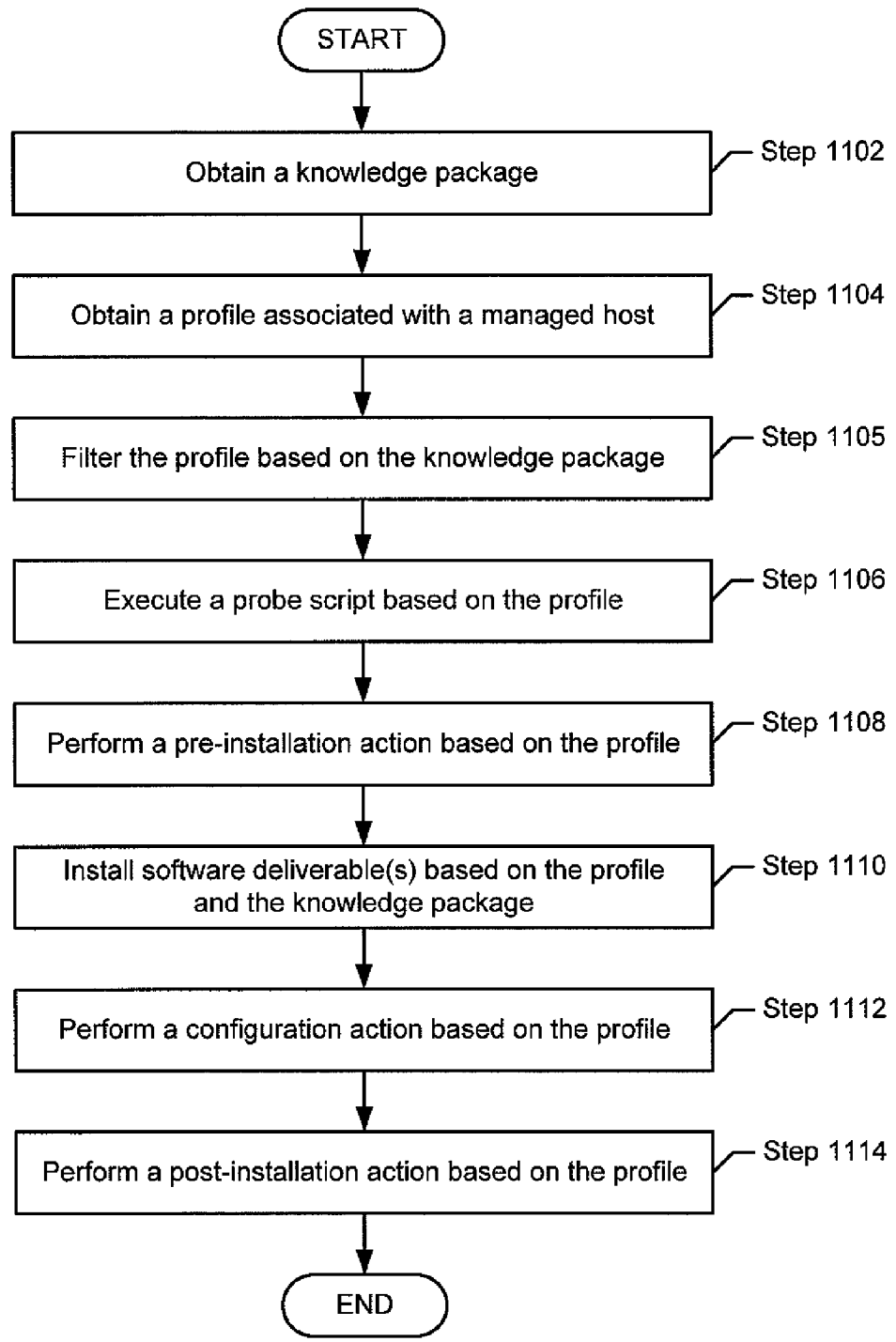
FIG. 11 shows a flowchart of a method for platform-agnostic software installation in accordance with one or more embodiments of the invention.

FIG. 11 shows a diagram of a method for platform-agnostic software installation in accordance with one or more embodiments of the invention. In one or more embodiments of the invention, one or more of the steps shown in FIG. 11 may be omitted, repeated, and/or performed in a different order than the order shown in FIG. 11. Accordingly, embodiments of the invention should not be considered limited to the specific ordering of steps shown in FIG. 11.

In one or more embodiments of the invention, the method shown in FIG. 11 is performed by the job agent's control logic and/or other components operating under control of the control logic. For example, one or more installers may be instructed to perform one or more steps shown in FIG. 11. In other words, in one or more embodiments of the invention, some or all of the method shown in FIG. 11 describes the behavior of the installer(s) after Step 1014 of FIG. 10, discussed above.

Initially, in Step 1102, a knowledge package is obtained. As discussed above, the knowledge package includes guidelines for obtaining and installing software deliverables. Further, in Step 1104, a profile associated with a managed host is obtained. The profile includes platform-agnostic data describing a desired system state of the managed host. For example, the platform-agnostic data may include probe scripts, pre-installation actions, install sets, configuration actions, and/or post-installation actions. In one or more embodiments of the invention, one or more of Steps 1106-1114 are performed based on the data present in the profile.

As noted above, in one or more embodiments of the invention, the platform-agnostic profile may include platform-specific data for multiple platforms. In other words, the profile may be considered platform-agnostic only within a particular set of supported platforms. In one or more embodiments of the invention, in Step 1105, the platform-agnostic profile is filtered to determine which of the data included in the profile are relevant to the targeted platform. For example, the platform-agnostic profile may include data for a version of a Windows® operating system and a version of a Linux operating system. If the targeted platform includes a Linux operating system, filtering the platform-agnostic profile may involve identifying which of the data are relevant to the Linux operating system. Windows® and Linux are mentioned here for exemplary purposes only, and many different types of filtering criteria may be used.

In one or more embodiments of the invention, the platform-agnostic profile is filtered based on the knowledge package. Specifically, because the knowledge package is specific to a particular platform, the knowledge package may be used to determine which of the data in the platform-agnostic profile are relevant to that particular platform. After filtering the profile, the profile may be thought of as platform-specific rather than platform-agnostic, because the parts of the profile that are not relevant to the targeted platform are discarded or ignored.

In one or more embodiments of the invention, if the profile includes a probe script, then the probe script is executed in Step 1106. As noted above, the probe script may be associated with a task, and may be executed to identify a condition of the managed host. If the condition satisfies the criteria specified in the probe script, then the associated task is performed. For example, the probe script may include criteria for installing a software deliverable only under certain conditions, such as only if a pre-requisite is present. Many different types of probe script conditions may be envisioned that remain within the scope of the invention.

In one or more embodiments of the invention, if the profile includes a pre-installation action, then the pre-installation action is performed in Step 1108. As noted above, the pre-installation action may be required before installing a software deliverable. For example, the pre-installation action may involve stopping a daemon prior to upgrading or removing the daemon. Many different types of pre-installation actions may be envisioned that remain within the scope of the invention.

In one or more embodiments of the invention, if the criteria of the probe script (if present) are satisfied and the pre-installation action (if present) has completed successfully, then one or more software deliverables are installed on the managed host in Step 1110. In one or more embodiments of the invention, the specific software deliverable(s) to install are based on an install set included in the profile. As noted above, the install set indicates all of the software deliverables required to satisfy the desired system state.

In one or more embodiments of the invention, if the profile includes a configuration action, then the configuration action is performed in Step 1112. As noted above, the configuration action includes information for configuring an installed software deliverable. The configured software deliverable may be the same software deliverable installed in Step 1110, or may be a different software deliverable. For example, after a software deliverable has been updated, another software deliverable may require a configuration change to maintain compatibility with the updated software deliverable. Many different types of configuration actions may be envisioned that remain within the scope of the invention.

In one or more embodiments of the invention, if the profile includes a post-installation action, then the post-installation action is performed in Step 1114. As noted above, post-installation actions include actions required to satisfy the desired system state after a software deliverable has been installed. For example, a post-installation action may involve restarting a daemon that was stopped during the installation. Another example of a post-installation action is executing a software deliverable that was installed. Many different types of post-installation actions may be envisioned that remain within the scope of the invention.

As noted above, profiles may be platform-agnostic. Thus, in one or more embodiments of the invention, the same profile is dispatched to multiple managed hosts having different platforms, so that the system state of each of the managed hosts can be updated to satisfy the system state. In other words, the same profile may be used to perform some or all of the method of FIG. 1 for multiple managed hosts having different platforms. The method may be performed either concurrently or at different times for each of the managed hosts.

Figure 12:
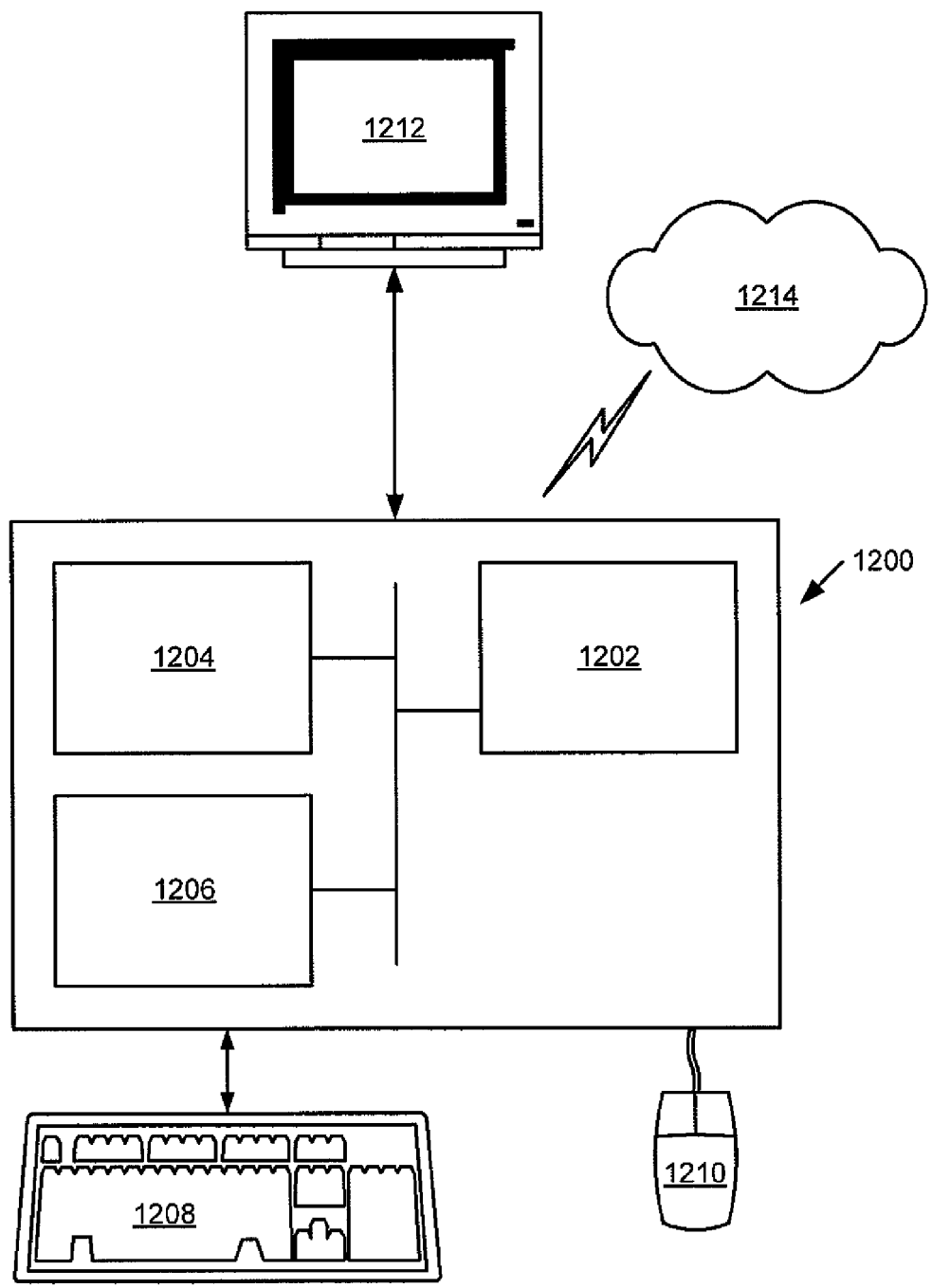
FIG. 12 shows a diagram of a computer system in accordance with one or more embodiments of the invention.

In general, embodiments of the invention use platform-agnostic profiles to support a robust installation process based on guidelines in a knowledge package. Specifically, platform-agnostic profiles include data that may be used to help ensure that the necessary actions are taken to properly install software deliverables based on the guidelines. Data in the profile may include, but are not limited to: probe scripts; pre-installation actions; install sets; configuration actions; and/or post-installation actions. Further, because the profiles are platform-agnostic, the profiles may be used to efficiently satisfy the system state for multiple managed hosts having different platforms, Embodiments of the invention may be implemented on virtually any type of computer regardless of the platform being used. For example, as shown in FIG. 12, a computer system (1200) includes a processor (1202), associated memory (1204), a storage device (1206), and numerous other elements and functionalities typical of today's computers (not shown). The computer (1200) may also include input means, such as a keyboard (1208) and a mouse (1210), and output means, such as a monitor (1212). The computer system (1200) may be connected to a network (1214) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (1200) may be located at a remote location and connected to the other elements over a network. Further, embodiments of the invention may be implemented on a distributed system having a plurality of nodes, where each portion of the invention (e.g., data source(s), crawl history, data crawler, data collector, data miner, metadata, data components, metadata filter, etc.) may be located on a different node within the distributed system. In one embodiment of the invention, the node is a computer system. Alternatively, the node may be a processor with associated physical memory. The node may alternatively be a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for platform-agnostic software installation, comprising:
   obtaining a first knowledge package, wherein the first knowledge package comprises guidelines for obtaining and installing a first plurality of software deliverables, wherein the first knowledge package defines the order in which the first plurality of software deliverables should be installed on at least one of a plurality of managed hosts and wherein the first knowledge package is platform-specific to a first operating system platform;
   obtaining a second knowledge package, wherein the second knowledge package comprises guidelines for obtaining and installing a second plurality of software deliverables, wherein the second knowledge package defines the order in which the second plurality of software deliverables should be installed on at least one of a plurality of managed hosts, wherein the second knowledge package is platform-specific to a second operating system platform, wherein the first operating system platform and the second operating system platform are different, and wherein the first knowledge package and the second knowledge package are different;
   obtaining a profile, wherein the profile is platform-agnostic, wherein the profile comprises data indicating a desired system state for a managed host, and wherein the profile comprises a first plurality of platform-specific components and a second plurality of platform-specific components;
   distributing the first knowledge package and the profile to a first managed host of the plurality of managed hosts, wherein the first managed host has the first operating system platform;
   distributing the second knowledge package and the profile to a second managed host of the plurality of managed hosts, wherein the second managed host has the second operating system platform;
   after distributing:
   filtering, by a first job agent executing on the first managed host, the profile based on the first knowledge package to obtain a first platform-specific profile for the first managed host, wherein the first platform-specific profile comprises the first plurality of platform-specific components; and
   filtering, by a second job agent executing on the second managed host, the profile based on the second knowledge package to obtain a second platform-specific profile for the second managed host, wherein the second platform-specific profile comprises the second plurality of platform-specific components, and wherein the first plurality of platform-specific components and the second plurality of platform-specific components are different;
   updating the first managed host to the desired system state using the first platform-specific profile; and
   updating the second managed host to the desired system state using the second platform-specific profile.

2. The method of claim 1, wherein the first plurality of platform-specific components comprises a probe script for testing a condition of the first managed host, and wherein updating the first managed host comprises conditionally executing an installation task based on the condition.

3. The method of claim 1, wherein the first plurality of platform-specific components comprises a pre-installation action, and wherein updating the first managed host comprises performing the pre-installation action prior to installing a software deliverable selected from the first plurality of software deliverables.

4. The method of claim 1, wherein the first plurality of platform-specific components comprises an install set, and wherein updating the first managed host comprises installing all software deliverables selected from the first plurality of software deliverables that are in the install set.

5. The method of claim 1, wherein the first plurality of platform-specific components comprises a configuration action, and wherein updating the first managed host comprises performing the configuration action to configure a software deliverable selected from the first plurality of software deliverables.

6. The method of claim 1, wherein the first plurality of platform-specific components comprises a post-installation action, and wherein updating the first managed host comprises performing the post-installation action after installation of a software deliverable selected from the first plurality of software deliverables.

7. The method of claim 1, wherein the first plurality of software deliverables comprises software deliverables for at least one software package selected from a group consisting of an operating system, an operating system patch, an operating system update, a software application, a software application patch, and a software application update.

8. A system comprising:
   a first managed host comprising a first processor and a first operating system platform;
   a second managed host comprising a second processor and a second operating system platform;
   an installation service, when executed by a third processor, configured to:
   obtain a first knowledge package, wherein the first knowledge package comprises guidelines for obtaining and installing a plurality of software deliverables, wherein the first knowledge package defines the order in which the plurality of software deliverables should be installed on at least one of a plurality of managed hosts and wherein the first knowledge package is platform-specific to a first operating system platform,
   obtain a second knowledge package, wherein the second knowledge package comprises guidelines for obtaining and installing a second plurality of software deliverables, wherein the second knowledge package defines the order in which the second plurality of software deliverables should be installed on at least one of a plurality of managed hosts, wherein the second knowledge package is platform-specific to a second operating system platform, wherein the first operating system platform and the second operating system platform are different, and wherein the first knowledge package and the second knowledge package are different, obtain a profile, wherein the profile is platform-agnostic, wherein the profile comprises data indicating a desired system state for a managed host, wherein the profile comprises a first plurality of platform-specific components and a second plurality of platform-specific components, and wherein the first plurality of platform-specific components and the second plurality of platform-specific components are different, distribute the first knowledge package and the profile to the first managed host, distribute the second knowledge package and the profile to the second managed host;

a first job agent executing on the first managed host and is configured to:

filter, on the first managed host, the profile based on the first knowledge package to obtain a first platform-specific profile, wherein the first platform-specific profile comprises the first plurality of platform-specific components, and update the first managed host to the desired system state using the first platform-specific profile; and a second job agent executing on the second managed host and is configured to:

filter the profile based on the second knowledge package to obtain a second platform-specific profile, wherein the second platform-specific profile comprises the second plurality of platform-specific components, and update the second managed host to the desired system state using the second platform-specific profile.

9. The system of claim 8, wherein the first plurality of platform-specific components comprises a probe script for testing a condition of the first managed host, and wherein updating the first managed host comprises conditionally executing an installation task based on the condition.

10. The system of claim 8, wherein the first plurality of platform-specific components comprises a pre-installation action, and wherein updating the first managed host comprises performing the pre-installation action prior to installing a software deliverable selected from the first plurality of software deliverables.

11. The system of claim 8, wherein the first plurality of platform-specific components comprises an install set, and wherein updating the first managed host comprises installing all software deliverables selected from the first plurality of software deliverables that are in the install set.

12. The system of claim 8, wherein the first plurality of platform-specific components comprises a configuration action, and wherein updating the first managed host comprises performing the configuration action to configure a software deliverable selected from the first plurality of software deliverables.

13. The system of claim 8, wherein the first plurality of platform-specific components comprises a post-installation action, and wherein updating the first managed host comprises performing the post-installation action after installation of a software deliverable selected from the first plurality of software deliverables.

14. The system of claim 8, wherein the first plurality of software deliverables comprises software deliverables for at least one software package selected from a group consisting of an operating system, an operating system patch, an operating system update, a software application, a software application patch, and a software application update.

* * * * *